April 11, 1939. O. J. SCHWARTZ 2,153,995
CAMERA PLATE HOLDER
Filed Aug. 19, 1937 2 Sheets-Sheet 1
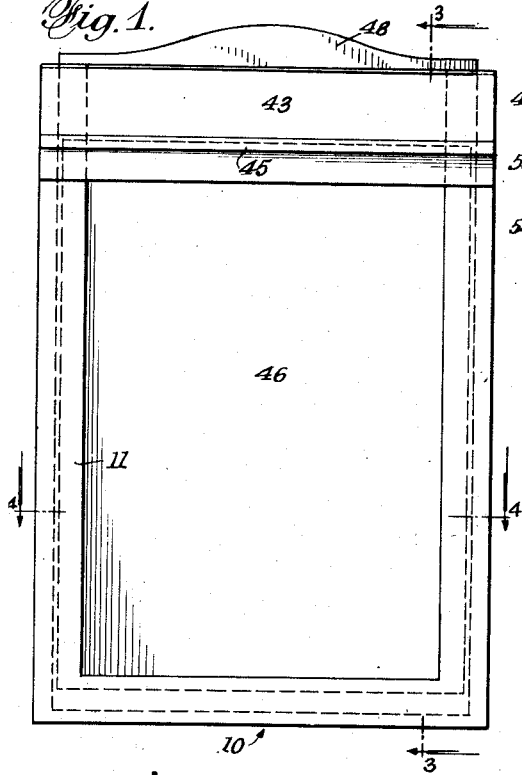
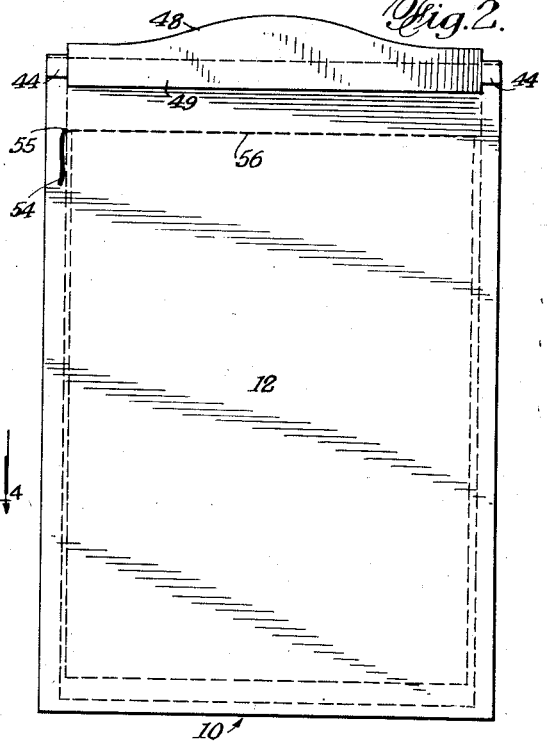
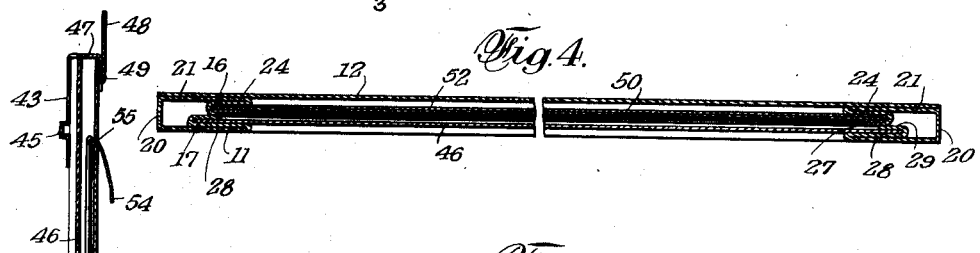
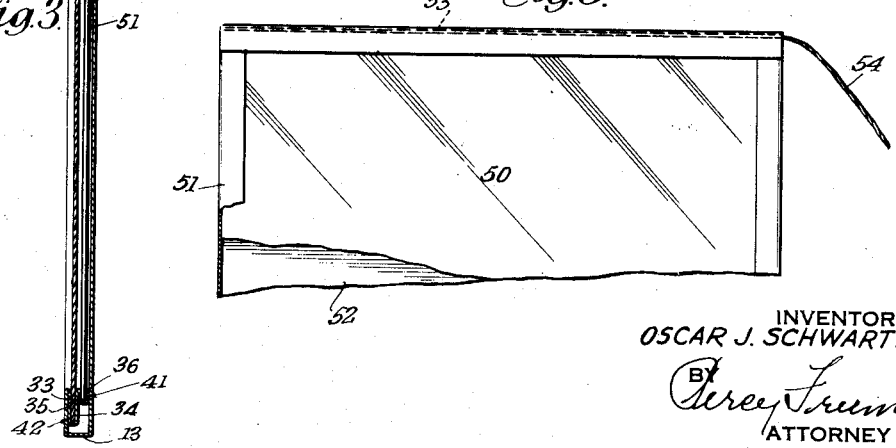
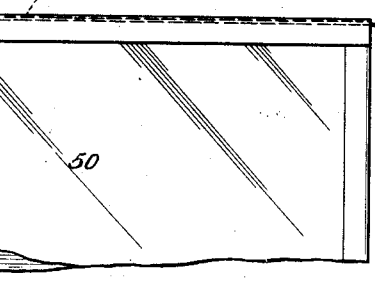
INVENTOR
OSCAR J. SCHWARTZ
BY
ATTORNEY April 11, 1939.   O. J. SCHWARTZ   2,153,995
CAMERA PLATE HOLDER
Filed Aug. 19, 1937   2 Sheets-Sheet 2
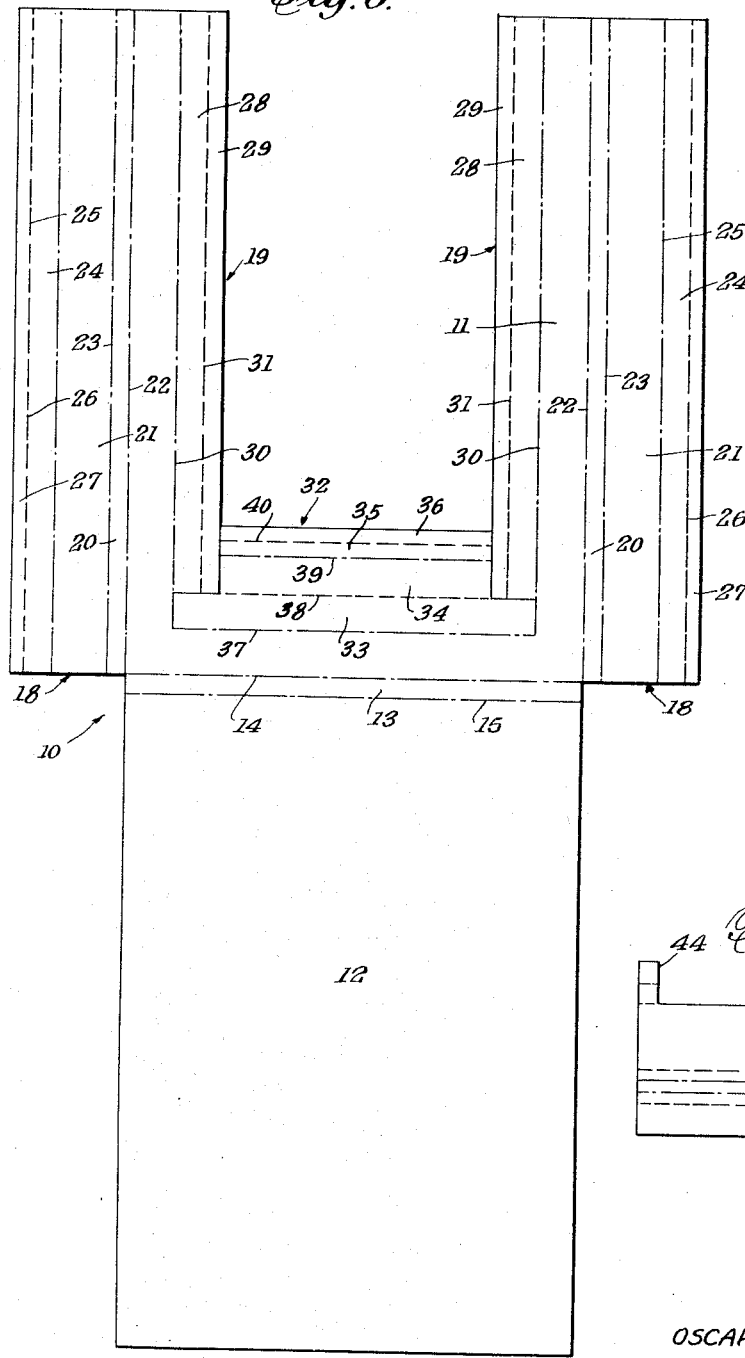
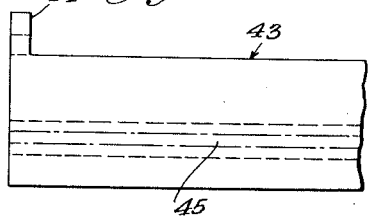
INVENTOR
OSCAR J. SCHWARTZ
BY
ATTORNEY Patented Apr. 11, 1939

2,153,995

UNITED STATES PATENT OFFICE 2,153,995

CAMERA PLATE HOLDER

Oscar J. Schwartz, New York, N. Y.

Application August 19, 1937, Serial No. 159,832

8 Claims. (Cl. 95—66)

This invention relates to plate holders for cameras and deals more particularly with a destructible plate holder the use of which will conserve time and, in the aggregate, be more economical than the expensive and cumbersome device now in common use.

The plate holders used today are usually made of substantial material such as wood and must be filled or loaded with a glass or film negative plate in the dark room of the photographic studio before being ready for use. This chore requires careful handling of the negative plates so they may not become inadvertently light-struck, marred by finger prints or scratches in the emulsion thereon, or otherwise injured.

In order to obviate the above-mentioned unnecessary handling of the plates, the present invention contemplates the provision of a plate holder in which the plate is already loaded and which, after the exposure of the plate, may be destroyed for ready removal of the plate therefrom. Hence, it is obvious that the photographic studios may be supplied with a quantity of inexpensive, expertly loaded plate holders which do not require special handling and which may be used in an easy and ready manner. Further, because of the compactness and light weight of the contemplated holders, a considerable number of these may be carried by a photographer outside the studio and he is thus enabled to take more shots of his subject. This he was unable to do when he was required to carry the bulkier old type of plate holder.

The invention further contemplates the provision of means for severing certain portions of the plate holder to facilitate removal of the plate.

With the foregoing and other features and advantages in mind, the invention resides in the novel combination and arrangement as illustrated in the accompanying drawings which are described in the following specification, and which disclose a preferred form of the invention as at present conceived.

In the drawings:

Fig. 1 is a front elevational view of a plate holder as contemplated in this invention.

Fig. 2 is a rear view thereof.

Fig. 3 is a vertical sectional view as taken on the line 3—3 of Fig. 1.

Fig. 4 is a cross sectional view, partly broken, to an enlarged scale, and is taken along the line 4—4 of Fig. 1.

Fig. 5 is an enlarged front view of the upper portion of the plate.

Fig. 6 is a flat view of the blank forming the plate holder.

Fig. 7 is a flat view of one end of a member used to reinforce the plate holder formed from the blank shown in Fig. 6.

Referring now to the drawings in greater detail, the plate holder is formed from a blank such as shown in Fig. 6, the holder and blank being generally designated 10. As herein contemplated, the blank may be made of stiff paper, bristol, or such other material which is light in weight, inexpensive, capable of being scored and bent to shape, and with all sufficiently durable to permit of considerable handling.

The plate holder is formed with a front frame portion 11 which is open at one end and a rear wall portion 12 integrally formed therewith, the frame 11 and the wall 12 being joined by a bottom wall 13. As seen in Fig. 3, the frame and rear wall may be arranged in spaced parallel relation, being bent along the score lines 14 and 15.

In forming the plate holder it is desired to provide two guideways. One guideway 16 is used for the plate and the other guideway 17, for the slide or mask. These guideways are preferably formed from integral portions of the blank, the guideways 16 being formed from the wing extensions 18 and the guideways 17 from the inreaching extensions 19.

Each extension 18 is integrally joined to the front frame 11 by a side or edge wall 20 and is provided with a panel 21 which is adapted to be cemented, glued, or otherwise securely fastened to the rear wall 12, score lines 22 and 23 being provided to permit positioning of said panel against said rear wall. The outer portion of each wing 18 is provided with a portion 24 adapted to be doubled back along the score line 25 to rest against the panel 21 and another score line 26 between the portion 24 and the outermost portion 27 permits said latter portion to be reentrantly bent to form the guideway 16.

In a somewhat similar manner, each extension 19, forming the two portions 28 and 29, and by means of the score lines 30 and 31, may be bent to form the guideways for the slide.

The bottom of the frame 11 is also integrally formed with an upreaching wing 32 forming the portions 33, 34, 35, and 36 which, by means of the score lines 37, 38, 39 and 40, may be folded to form a bottom stop and guide 41 for the plate and a similar guide and stop 42 for the slide.

In order to lend more rigidity to the holder formed in the above manner, a bridge-like member 43 is positioned across the open upper portion of the frame 11 and glued to the upper ends of the frame. To further strengthen the holder, the bridge member is provided with spaced extensions 44 which are adapted to be bent across the top of the holder and glued or cemented to the rear wall as shown in Fig. 2. These extensions are spaced to provide for the insertion or removal of the slide.

Since the plate holder must have a definite position in the camera, the bridge 43 is provided with a head 45 which acts as a stop against a cooperating portion of the camera, said head also serving to seal the plate holder cavity against the admission of light. The head also acts to stiffen the bridge and thus strengthens the holder.

The slide 46 may be one of usual design or may also be made of the material from which the holder is made, being provided with a top portion 47 adapted to overstand the plate chamber and with a tab or handle 48 by means of which it may be removed or inserted. To further seal the plate chamber, the slide is formed with a portion 49 which engages against the rear wall 12 of the holder.

The plate 50 is preferably enclosed in a paper frame 51 which has a back 52. As herein contemplated, the plate frame has incorporated, along the top edge thereof, means such as the tearing thread 53 which is extended beyond the edge of the frame as at 54 to form a grip by means of which the top of the frame may be slitted for removal of the plate from the frame.

As seen in Fig. 2, the thread end 54 is strung through a small opening 55 in the rear wall 12 of the holder, and in line with said opening and substantially across said rear wall, is provided a perforated tearing line 56.

In use, the photographer, receives the plate holder completely assembled with plate and slide. He inserts the holder in the camera, removes the slide, exposes the plate, and replaces the slide. He now removes the plate holder and in the dark room of his studio, pulls the thread end 54 to sever the plate frame and simultaneously tear along the perforated line 56 of the rear wall of the holder. He may now further tear the holder apart if he desires, but in any event the plate 50 now may be readily removed from the holder for developing.

From the foregoing it will be apparent that a simple, fool-proof device has been provided for the purpose intended; that the handling of negative plates has been made easier and safer, to obviate mutilation thereof; and that the photographer's task has been lightened both from the standpoint of saving his time and reducing the weight of his necessary apparatus.

While the present disclosure is at present preferred, it is readily seen that skilled persons may vary the structure without departing from the spirit and scope of the invention as claimed. Hence, the prior art rather than the instant disclosure should form the basis of interpretation of the scope of the invention.

I claim:

1. A plate holder comprising a card board member scored and bent to provide a guideway for a negative plate and a guideway for a slide, said card board member being integrally formed and adapted by the incorporation therein of a weakening line to be readily mutilated for the removal of the negative plate therefrom.

2. A plate holder comprising a card board member integrally forming front, rear, side and bottom portions, said member being provided with score lines at the points of bending of adjacent of said portions and said front portion being formed as an open ended frame; and a cardboard member secured to the upper end portions of said frame.

3. A plate holder comprising a front frame member having an open upper end, side walls and a bottom wall integrally formed therewith, a rear wall integrally formed with said bottom wall, lateral wing portions integrally formed with the side walls and adapted to be secured to said rear wall, guide means for a negative plate integrally formed with said wing portions, and guide means for a slide integrally formed with the vertical portions of said front frame.

4. A card board blank for forming a destructible plate holder comprising a U-shaped frame member having lateral outer wing portions for forming guide means for a negative plate and lateral inner wing portions for forming guide means for a slide, and a member integrally formed with said U frame and adapted to be bent in superposed and parallel relation with said U frame.

5. In a plate holder adapted to hold a negative plate, a frame for said plate, means for positioning said framed plate in said holder, and means associated with the plate frame for simultaneously disrupting said frame and said holder for removal of said plate from said holder.

6. A plate holder for a negative plate, a frame around said plate, and means for simultaneously disrupting said frame and said holder for removal of said plate from said holder, said means comprising a perforated portion of said holder and a string embedded in said frame and having a free end adapted to be pulled along said perforated portion.

7. In combination, a plate holder having a perforated portion, a negative plate holding a frame in said holder, means in said holder for positioning said frame, and a tear string secured to the inside of said frame and having a free end adapted to be grasped, said plate holder being formed with an opening through which said free end of the string may be passed.

8. In combination with a disruptible plate holder, a negative plate holding frame, and a tear string embedded in said frame and having a free end adapted to be grasped.

OSCAR J. SCHWARTZ.